(12) United States Patent
Richards

(10) Patent No.: US 7,688,346 B2
(45) Date of Patent: Mar. 30, 2010

(54) VTV SYSTEM

(76) Inventor: Angus Duncan Richards, 13428 Maxella Ave., #223, Marina Del Rev., CA (US) 90292

( * ) Notice: Subject to any disclaimer, the term of this patent is extended or adjusted under 35 U.S.C. 154(b) by 1182 days.

(21) Appl. No.: 11/230,173

(22) Filed: Sep. 19, 2005

(65) Prior Publication Data
US 2006/0082643 A1    Apr. 20, 2006

Related U.S. Application Data

(63) Continuation of application No. 09/891,733, filed on Jun. 25, 2001, now abandoned.

(51) Int. Cl.
*H04N 7/00*   (2006.01)
*G06T 15/00*  (2006.01)

(52) U.S. Cl. .......................................... 348/36; 345/419

(58) Field of Classification Search ................... 348/36, 348/37, 38, 39, 47; 345/419, 474; 364/514
See application file for complete search history.

(56) References Cited

U.S. PATENT DOCUMENTS

| | | | | |
|---|---|---|---|---|
| 5,850,352 A | * | 12/1998 | Moezzi et al. | 345/419 |
| 6,654,019 B2 | * | 11/2003 | Gilbert et al. | 345/474 |
| 6,765,569 B2 | * | 7/2004 | Neumann et al. | 345/419 |

* cited by examiner

*Primary Examiner*—Gims S Philippe

(57) ABSTRACT

The following patent relates to an overall hardware configuration that produces an enhanced spatial television-like viewing experience. Unlike normal television, with this system the viewer is able to control both the viewing direction and relative position of the viewer with respect to the movie action. In addition to a specific hardware configuration, this patent also relates to a new video format which makes possible this virtual reality like experience.

32 Claims, 16 Drawing Sheets

Overall system:

Basic configuration:

Advanced configuration:

Display field:

Virtual sound:

Elevation:

Roll:

Forwards/Backwards:

Left/Right:

Up/Down:

| CONTROL FIELD | BITS | VALUE | ASSIGNMENT KEY |
|---|---|---|---|
| FRAME FLIP | FF | | FLIP MEMORY FRAMES |
| FIELD TYPE | F2-F0 | 0 | FOREGROUND VIDEO (ARM) |
| | | 1 | BACKGROUND VIDEO (VRM) |
| | | 2 | DIGITAL HYBRID (TM) |
| | | 3 | DIGITAL BIT STREAM FRAME (TM) |
| | | 4 | RESERVED |
| | | 5 | RESERVED |
| | | 6 | RESERVED |
| | | 7 | DIGITAL CONTROL FRAME |
| PAGE NUMBER | P3-P0 | 0-15 | (DEPENDANT UPON MEM LAYOUT) |
| AUDIO SYNC | AS | | RESET AUDIO BUFFER TO ZERO |
| ELEVATION CORRECTION | E8-E0 | (+/- 45 DEG) | CAMERA ELEVATION |
| AZIMUTH CORRECTION | A10-A0 | (+/- 180 DEG) | CAMERA AZIMUTH |
| AUDIO TRACKS | T1-T0 | 0 | NO AUDIO TRACKS |
| | | 1 | 4 AUDIO TRACKS |
| | | 2 | 8 AUDIO TRACKS |
| | | 3 | OBJECT BASED AUDIO |
| AUDIO SAMPLE RATE | S1-S0 | 0 | 2/4 LINES (15K S/S) |
| | | 1 | 3/6 LINES (23K S/S) |
| | | 2 | 4/8 LINES (31k S/S) |
| | | 3 | 5/10 LINES (38K S/S) |

FIG. 21

VTV SYSTEM

CROSS-REFERENCE TO RELATED APPLICATION

This application is a continuation of application Ser. No. 09/891,733, filed Jun. 25, 2001 now abandoned.

BACKGROUND AND SUMMARY OF THE INVENTION

The following patent relates to an overall hardware configuration that produces an enhanced spatial television-like viewing experience. Unlike normal television, with this system the viewer is able to control both the viewing direction and relative position of the viewer with respect to the movie action. In addition to a specific hardware configuration, this patent also relates to a new video format which makes possible this virtual reality like experience. Additionally, several proprietary video compression standards are also defined which facilitate this goal. The VTV system is designed to be an intermediary technology between conventional two-dimensional cinematography and true virtual reality. There are several stages in the evolution of the VTV system ranging from, in its most basic form, a panoramic display system to, in its most sophisticated form featuring full object based virtual reality utilizing animated texture maps and featuring live actors and/or computer-generated characters in a full "environment aware" augmented reality system.

As can be seen in FIG. 1 the overall VTV system consists of a central graphics processing device (the VTV processor), a range of video input devices (DVD, VCR, satellite, terrestrial television, remote video cameras), infrared remote control, digital network connection and several output device connections. In its most basic configuration as shown in FIG. 2, the VTV unit would output imagery to a conventional television device. In such a configuration a remote control device (possibly infrared) would be used to control the desired viewing direction and position of the viewer within the VTV environment. The advantage of this "basic system configuration" is that it is implementable utilizing current audiovisual technology. The VTV graphics standard is a forwards compatible graphics standard which can be thought of as a "layer" above that of standard video. That is to say conventional video represents a subset of the new VTV graphics standard. As a result of this standard's compatibility, VTV can be introduced without requiring any major changes in the television and/or audiovisual manufacturers specifications. Additionally, VTV compatible television decoding units will inherently be compatible with conventional television transmissions.

In a more sophisticated configuration, as shown in FIG. 3, the VTV system uses a wireless HMD as the display device. In such a configuration the wireless HMD can be used as a tracking device in addition to simply displaying images. This tracking information in the most basic form could consist of simply controlling the direction of view. In a more sophisticated system, both direction of view and position of the viewer within the virtual environment can be determined. Ultimately, in the most sophisticated implementation, remote cameras on the HMD will provide to the VTV system, real world images which it will interpret into spatial objects, the spatial objects can then be replaced with virtual objects thus providing an "environment aware" augmented reality system.

The wireless HMD is connected to the VTV processor by virtue of a wireless data link "Cybernet link". In its most basic form this link is capable of transmitting video information from the VTV processor to the HMD and transmitting tracking information from the HMD to the VTV processor. In its most sophisticated form the cybernet link would transmit video information both to and from the HMD in addition to transferring tracking information from the HMD to the VTV processor. Additionally certain components of the VTV processor may be incorporated in the remote HMD thus reducing the data transfer requirement through the cybernet link. This wireless data link can be implemented in a number of different ways utilizing either analog or digital video transmission (in either an un-compressed or a digitally compressed format) with a secondary digitally encoded data stream for tracking information. Alternately, a purely digital uni-directional or bi-directional data link which carries both of these channels could be incorporated. The actual medium for data transfer would probably be microwave or optical. However either transfer medium may be utilized as appropriate. The preferred embodiment of this system is one which utilizes onboard panoramic cameras fitted to the HMD in conjunction with image analysis hardware on board the HMD or possibly on the VTV base station to provide real-time tracking information. To further improve system accuracy, retroflective markers may also the utilized in the "real world environment". In such a configuration, switchable light sources placed near to the optical axis of the on-board cameras would be utilized in conjunction with these cameras to form a "differential image analysis" system. Such a system features considerably higher recognition accuracy than one utilizing direct video images alone.

Ultimately, the VTV system will transfer graphic information utilizing a "universal graphics standard". Such a standard will incorporate an object based graphics description language which achieves a high degree of compression by virtue of a "common graphics knowledge base" between subsystems. This patent describes in basic terms three levels of progressive sophistication in the evolution of this graphics language.

These three compression standards will for the purpose of this patent be described as:

a) c-com b) s-com c) v-com

In its most basic format the VTV system can be thought of as a 360 Degree panoramic display screen which surrounds the viewer.

This "virtual display screen" consists of a number of "video Pages". Encoded in the video image is a "Page key code" which instructs the VTV processor to place the graphic information into specific locations within this "virtual display screen". As a result of this ability to place images dynamically it is possible to achieve the effective equivalent to both high-resolution and high frame rates without significant sacrifice to either. For example, only sections of the image which are rapidly changing require rapid image updates whereas the majority of the image is generally static. Unlike conventional cinematography in which key elements (which are generally moving) are located in the primary scene, the majority of a panoramic image is generally static.

BRIEF DESCRIPTION OF DRAWINGS

FIG. 21 is a table showing one possible configuration of VTV digital header data.

VTV GRAPHICS STANDARD

Figure 1:
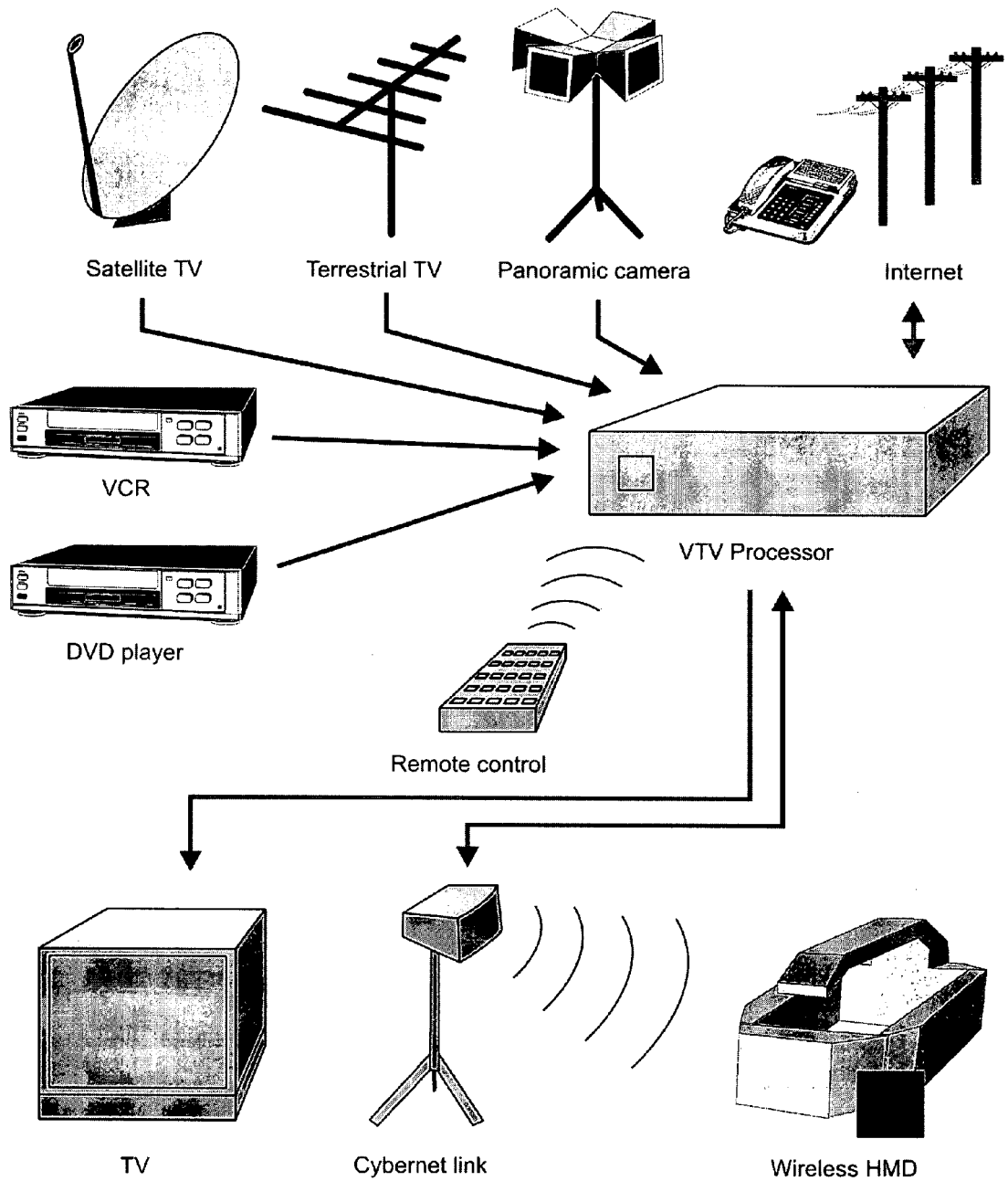
FIG. 1 is a schematic diagram of an overall VTV system.
Figure 2:
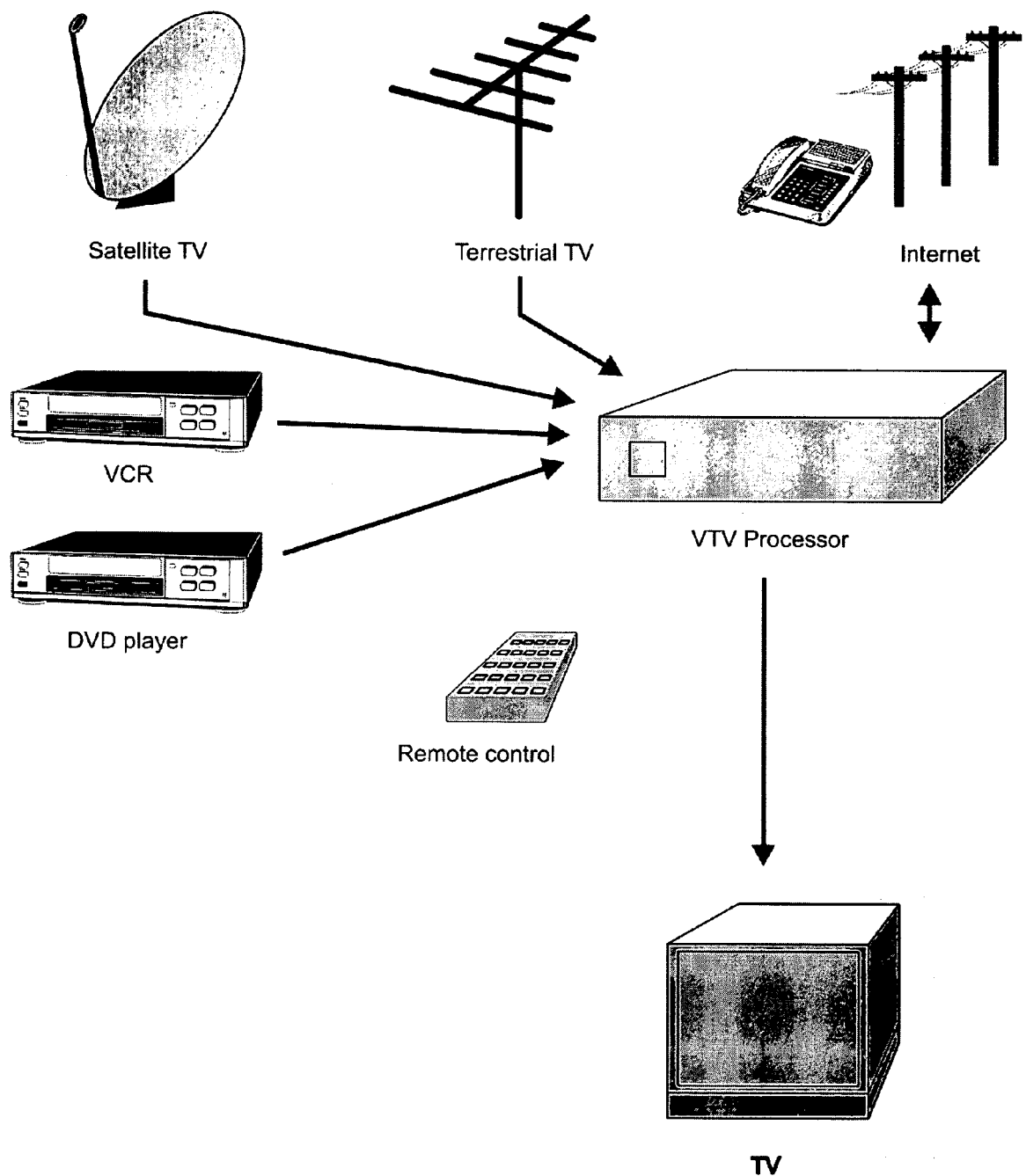
FIG. 2 is a schematic diagram of a VTV system according to its basic configuration.
Figure 3:
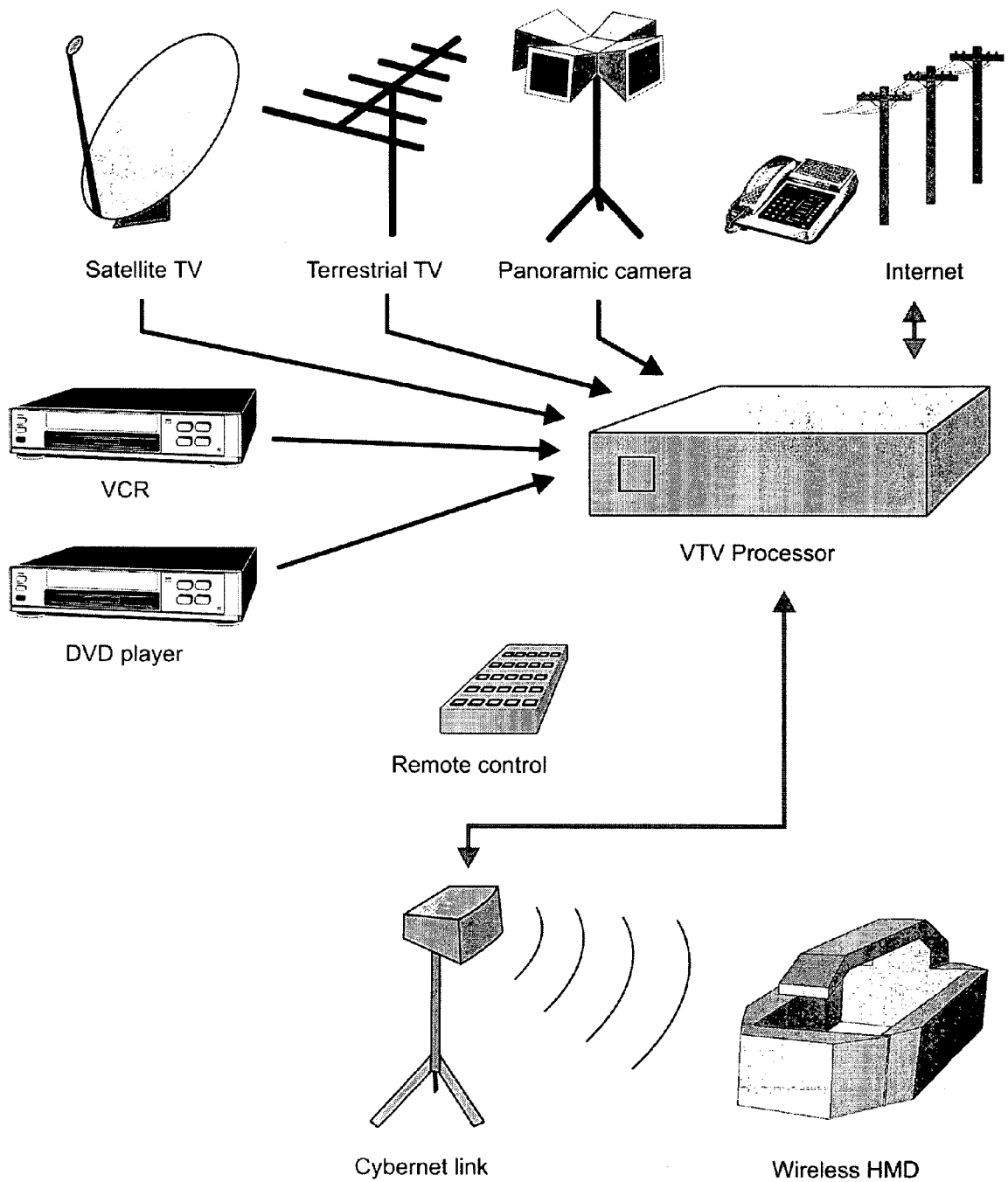
FIG. 3 is a schematic diagram of a VTV system according to an advanced configuration.
Figure 4:
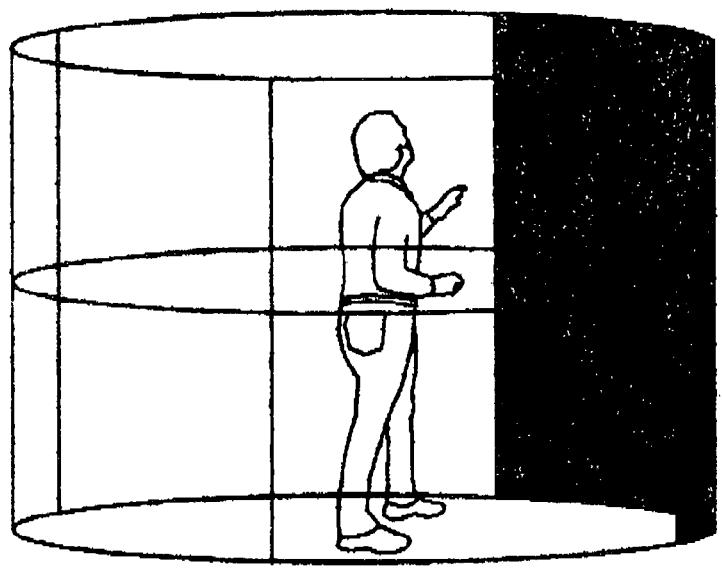
FIG. 4 is an illustration of a cylindrical virtual display field.

In its most basic form the VTV graphics standard consists of a virtual 360 degree panoramic display screen upon which video images can be rendered from an external video source such as VCR, DVD, satellite, camera or terrestrial television receiver such that each video frame contains not only the video information but also information that defines its location within the virtual display screen. Such a system is remarkably versatile as it provides not only variable resolution images but also frame rate independent imagery. That is to say, the actual update rate within a particular virtual image (entire virtual display screen) may vary within the display screen itself. This is inherently accomplished by virtue of each frame containing its virtual location information. This allows active regions of the virtual image to be updated quickly at the nominal perception cost of not updating sections on the image which have little or no change. Such a system is shown in FIG. 4.

Figure 5:
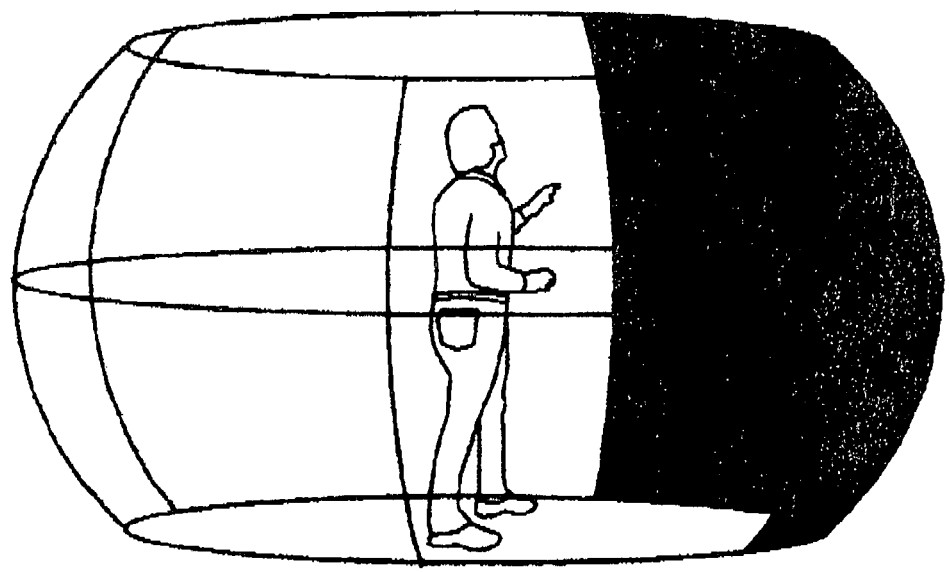
FIG. 5 is an illustration of a truncated spherical virtual display field.

To further improve the realism of the imagery, the basic VTV system can be enhanced to the format shown in FIG. 5. In this configuration the cylindrical virtual display screen is interpreted by the VTV processor as a truncated sphere. This effect can be easily generated through the use of a geometry translator or "Warp Engine" within the digital processing hardware component of the VTV processor.

Figure 11:
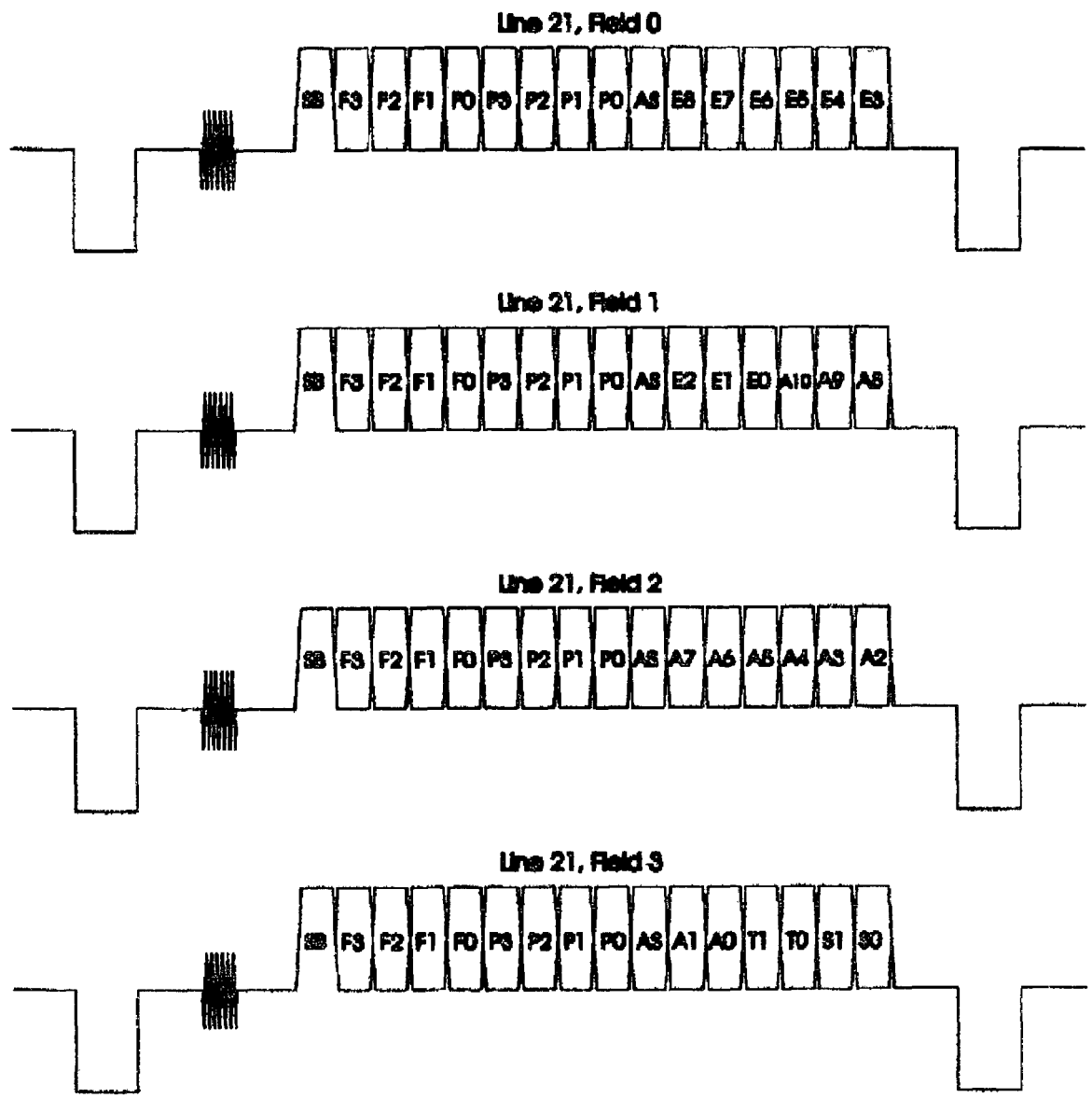
FIG. 11 is an example of an analogue video compatible VTV encoded video line shown containing digital data.

Due to constant variation of absolute planes of reference, mobile camera applications (either HMD based or Pan-Cam based) require additional tracking information for azimuth and elevation of the camera system to be included with the visual information in order that the images can be correctly decoded by the VTV graphics engine. In such a system, absolute camera azimuth and elevation becomes part of the image frame information. There are several possible techniques for the interpretation of this absolute reference data. Firstly, the coordinate data could be used to define the origins of the image planes within the memory during the memory writing process. Unfortunately this approach will tend to result in remnant image fragments being left in memory from previous frames with different alignment values. A more practical solution is simply to write the video information into memory with an assumed reference point of 0 azimuth, 0 elevation. This video information is then correctly displayed by correcting the display viewport for the camera angular offsets. One possible data format for such a system is shown in FIG. 11 and FIG. 21.

Figure 6:
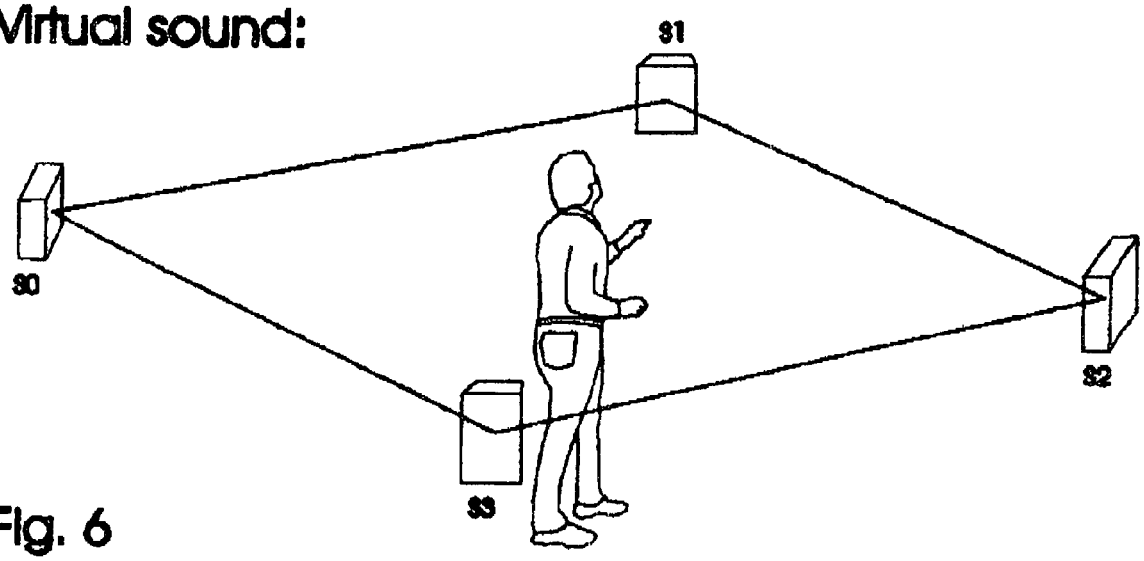
FIG. 6 is an illustration of a virtual representation of a 4 track sound system.
Figure 7:
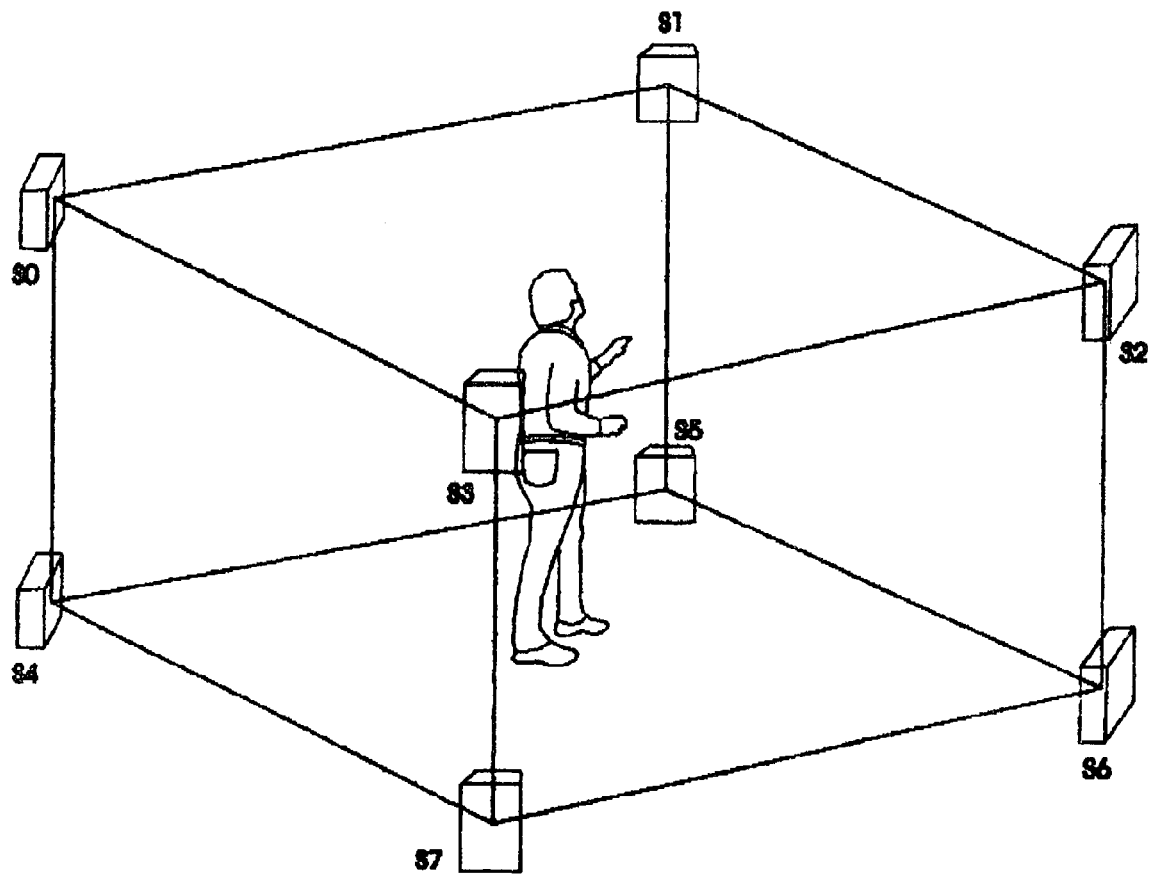
FIG. 7 is an illustration of a virtual representation of an 8 track sound system.

Audio Standards:

In addition to 360 Degree panoramic video, the VTV standard also supports either 4 track (quadraphonic) or 8 track (octaphonic) spatial audio. A virtual representation of the 4 track system is shown in FIG. 6. In the case of the simple 4 track audio system sound through the left and right speakers of the sound system (or headphones, in the case of an HMD based system) is scaled according to the azimuth the of the view port (direction of view within the VR environment). In the case of the 8 track audio system sound through the left and right speakers of the sound system (or headphones, in the case of an HMD based system) is scaled according to both the azimuth and elevation of the view port, as shown in the virtual representation of the system, FIG. 7.

Figure 12:
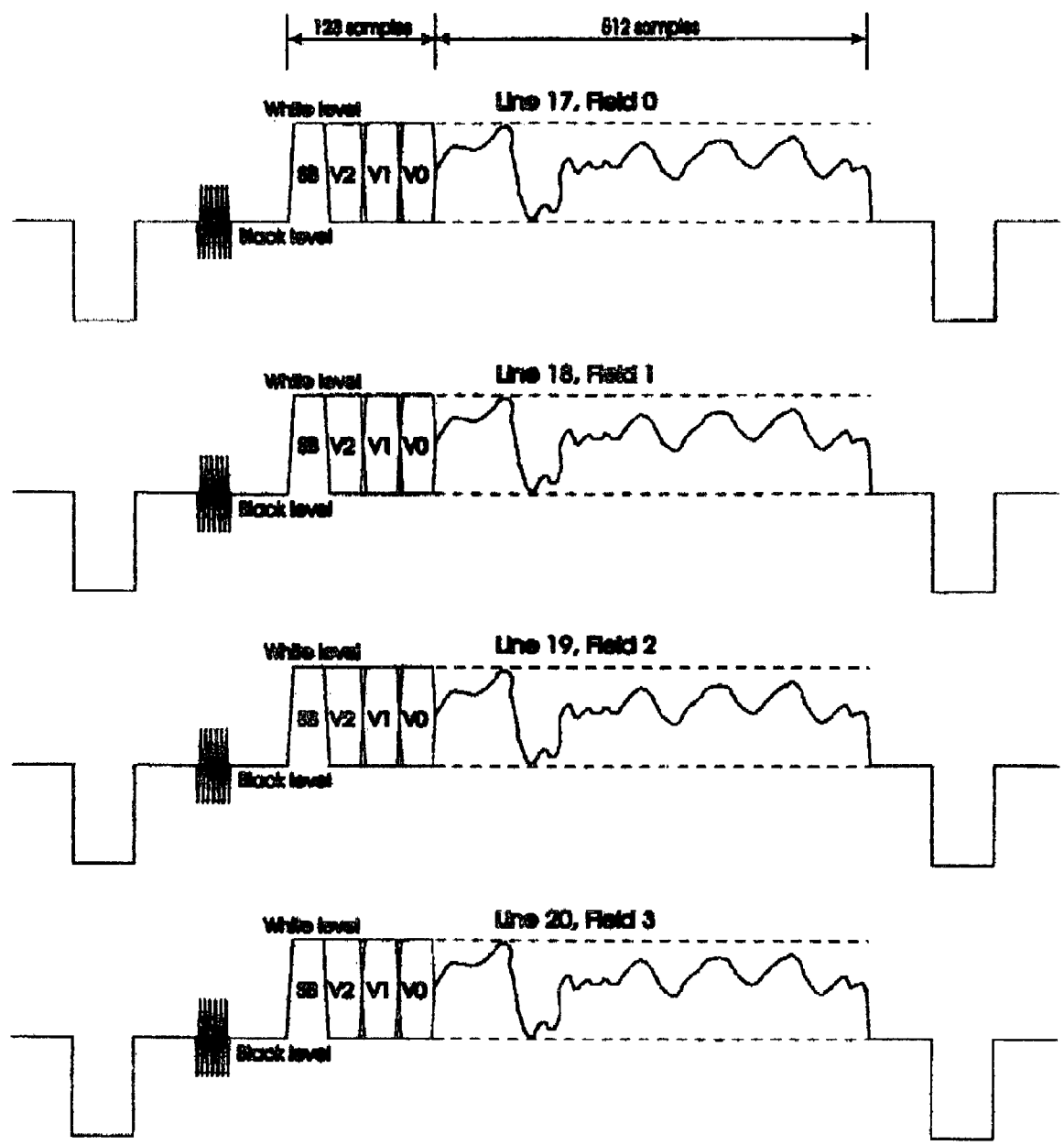
FIG. 12 is an example of an analogue video compatible VTV encoded video line shown containing audio data.
Figure 13:
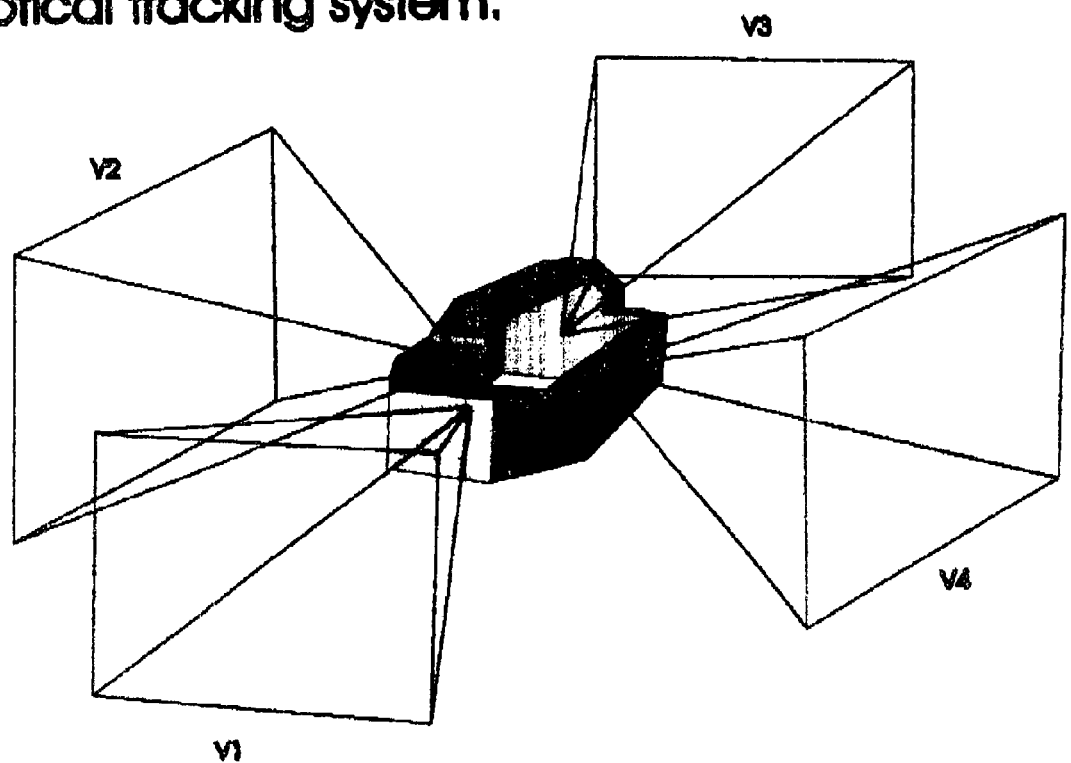
FIG. 13 is a diagram of an optical tracking system for detecting changes in position and orientation.
Figure 14:
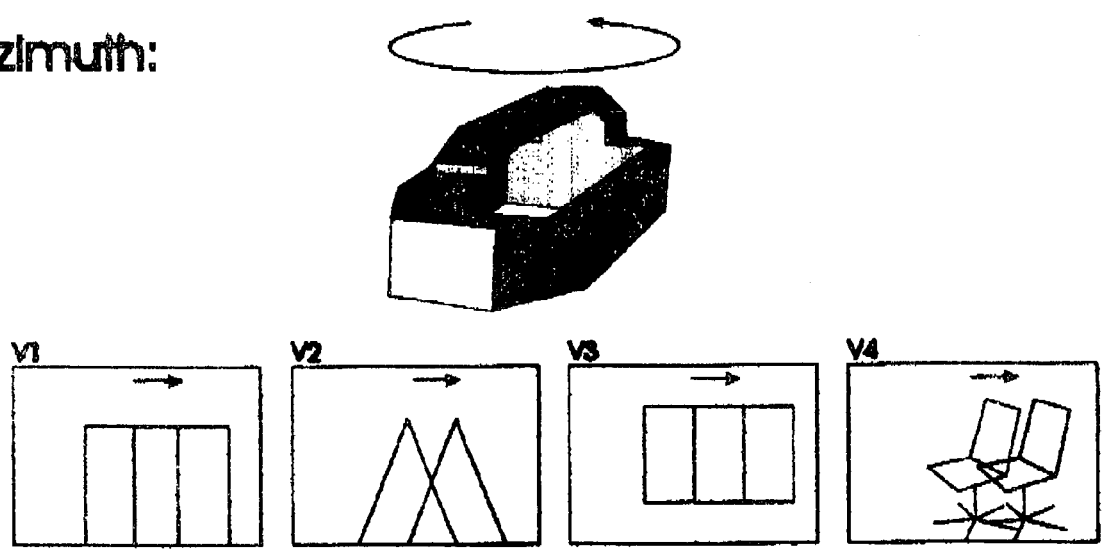
FIG. 14 is a diagram of an optical tracking system for detecting azimuth changes in orientation.
Figure 15:
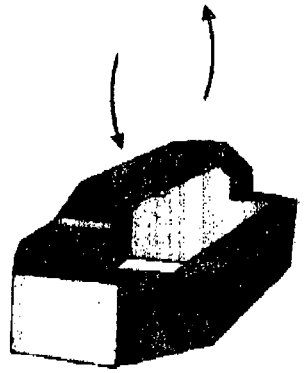
FIG. 15 is a diagram of an optical tracking system for detecting elevation changes in orientation.
Figure 15:
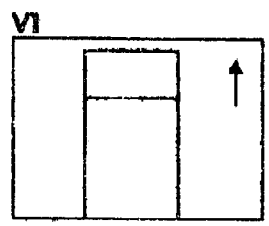
Figure 15:
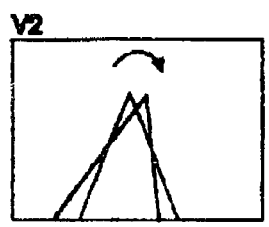
Figure 15:
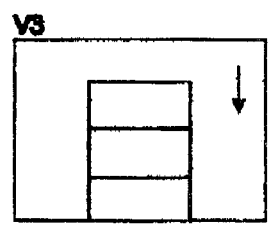
Figure 15:
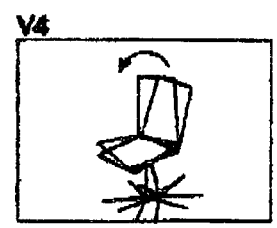
Figure 16:
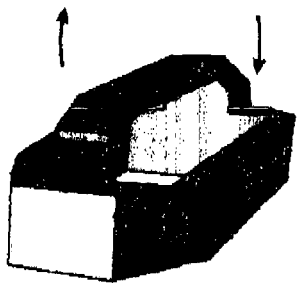
FIG. 16 is a diagram of an optical tracking system for detecting roll changes in orientation.
Figure 16:
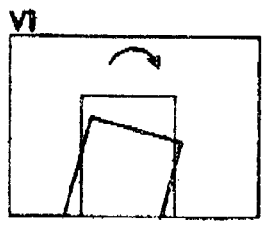
Figure 16:
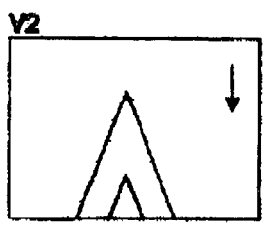
Figure 16:
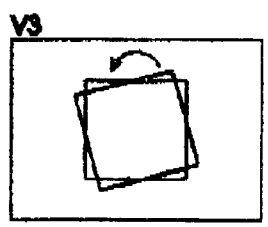
Figure 16:
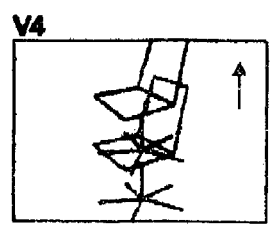
Figure 17:
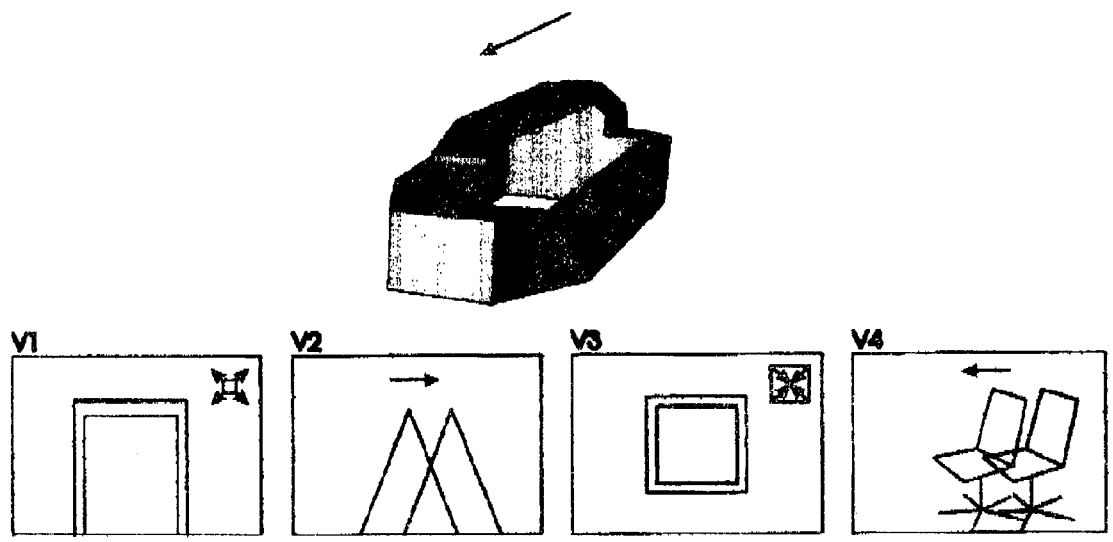
FIG. 17 is a diagram of an optical tracking system for detecting forwards/backwards changes in position.
Figure 18:
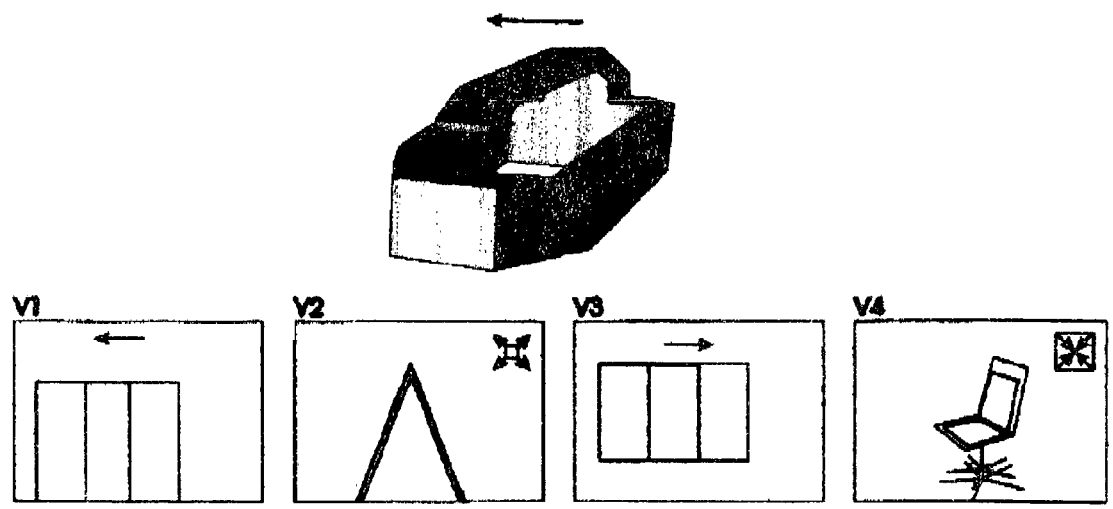
FIG. 18 is a diagram of an optical tracking system for detecting left/right changes in position.
Figure 19:
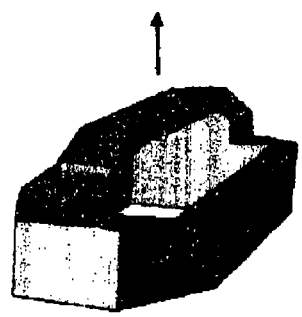
FIG. 19 is a diagram of an optical tracking system for detecting up/down changes in position.
Figure 19:
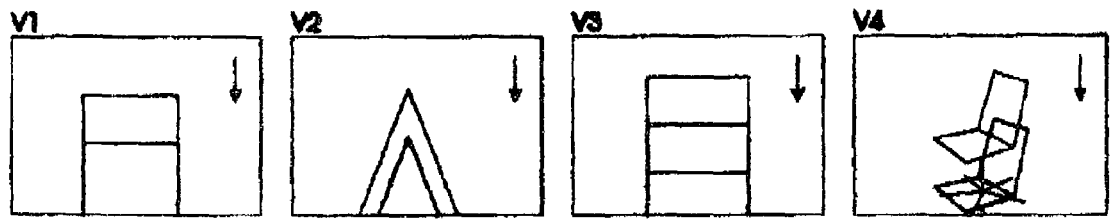

In its most basic form, the VTV standard encodes the multi-track audio channels as part of the video information in a digital/analogue hybrid format as shown in FIG. 12. As a result, video compatibility with existing equipment can be achieved. As can be seen in this illustration, the audio data is stored in a compressed analogue coded format such that each video scan line contains 512 audio samples. In addition to this analogue coded audio information, each audio scan line contains a three bit digital code that is used to "pre-scale" the audio information. That is to say that the actual audio sample value is X*S where X is the pre-scale number and S is the sample value. Using this dual-coding scheme the dynamic range of the audio system can be extended from about 43 dB to over 60 dB. Secondly, this extending of the dynamic range is done at relatively "low cost" to the audio quality because we are relatively insensitive to audio distortion when the overall signal level is high. The start bit is an important component in the system. It's function is to set the maximum level for the scan line (i.e. the 100% or white level) This level in conjunction with the black level (this can be sampled just after the colour burst) forms the 0% and 100% range for each line. By dynamically adjusting the 0% and 100% marks for each line on a line by line basis, the system becomes much less sensitive to variations in black level due to AC-coupling of video sub modules and/or recording and play back of the video media in addition to improving the accuracy of the decoding of the digital component of the scan line.

In addition to this pre-scaling of the digital information, an audio control bit (AS) is included in each field (at line 21). This control bit sets the audio buffer sequence to 0 when it is set. This provides a way to synchronize the 4 or 8 track audio information so that the correct track is always being updated from the current data regardless of the sequence of the video Page updates.

In more sophisticated multimedia data formats such as computer AV. files and digital television transmissions, these additional audio tracks could be stored in other ways which may be more efficient or otherwise advantageous.

It should be noted that, in addition to it's use as an audio-visual device, this spatial audio system/standard could also be used in audio only mode by the combination of a suitable compact tracking device and a set of cordless headphones to realize a spatial-audio system for advanced hi-fi equipment.

Enhancements:

In addition to this simplistic graphics standard, there a are number of enhancements which can be used alone or in conjunction with the basic VTV graphics standard. These three graphics standards will be described in detail in subsequent patents, however for the purpose of this patent, they are known as:

a) c-com b) s-com c) v-com

The first two standards relate to the definitions of spatial graphics objects where as the third graphics standard relates to a complete VR environment definition language which utilizes the first standards as a subset and incorporates additional environment definitions and control algorithms.

The VTV graphic standard (in its basic form) can be thought of as a control layer above that of the conventional video standard (NTSC, PAL etc.). As such, it is not limited purely to conventional analog video transmission standards. Using basically identical techniques, the VTV standard can operate with the HDTV standard as well as many of the computer graphic and industry audiovisual standards.

VTV Processor:

The VTV graphics processor is the heart of the VTV system. In its most basic form this module is responsible for the real-time generation of the graphics which is output to the display device (either conventional TV/HDTV or HMD). In addition to digitizing raw graphics information input from a video media provision device such as VCR, DVD, satellite, camera or terrestrial television receiver. More sophisticated versions of this module may real-time render graphics from a "universal graphics language" passed to it via the Internet or other network connection. In addition to this digitizing and graphics rendering task, the VTV processor can also perform image analysis. Early versions of this system will use this image analysis function for the purpose of determining tracking coordinates of the HMD. More sophisticated versions of this module will in addition to providing this tracking information, also interpret the real world images from the HMD as physical three-dimensional objects. These three-dimensional objects will be defined in the universal graphics language which can then be recorded or communicated to similar remote display devices via the Internet or other network or alternatively be replaced by other virtual objects of similar physical size thus creating a true augmented reality experience.

The VTV hardware itself consists of a group of sub modules as follows:

a) video digitizing module b) Augmented Reality Memory (ARM)

c) Virtual Reality Memory (VRM)

d) Translation Memory (TM)

e) digital processing hardware f) video generation module

The exact configuration of these modules is dependent upon other external hardware. For example, if digital video sources are used then the video digitizing module becomes relatively trivial and may consist of no more than a group of latch's or FIFO buffer. However, if composite or Y/C video inputs are utilized then additional hardware is required to convert these signals into digital format. Additionally, if a digital HDTV signal is used as the video input source then an HDTV decoder is required as the front end of the system (as HDTV signals cannot be processed in compressed format).

In the case of a field based video system such as analogue TV, the basic operation of the VTV graphics engine is as follows:

a) Video information is digitized and placed in the augmented reality memory on a field by field basis assuming an absolute Page reference of 0 degree azimuth, 0 degree elevation with the origin of each Page being determined by the state of the Page number bits (P3-P0).

b) Auxiliary video information for background and/or floor/ceiling maps is loaded into the virtual reality memory on a field by field basis dependent upon the state of the "field type" bits (F3-F0) and Page number bits (P3-P0).

c) The digital processing hardware interprets this information held in augmented reality and virtual reality memory and utilizing a combination of a geometry processing engine (Warp Engine), digital subtractive image processing and a new versatile form of "blue-screening", translates and selectively combines this data into an image substantially similar to that which would be seen by the viewer if they were standing in the same location as that of the panoramic camera when the video material was filmed. The main differences between this image and that available utilizing conventional video techniques being that it is not only 360 degree panoramic but also has the ability to have elements of both virtual reality and "real world" imagery melded together to form a complex immersive augmented reality experience.

d) The exact way in which the virtual reality and "real world imagery" is combined depends upon the mode that the VTV processor is operating in and is discussed in more detail in later sections of this specification. The particular VTV processor mode is determined by additional control information present in the source media and thus the processing and display modes can change dynamically while displaying a source of VTV media.

e) The video generation module then generates a single or pair of video images for display on a conventional television or HMD display device. Although the VTV image field will be updated at less than full frame rates (unless multi-spin DVD devices are used as the image media) graphics rendering will still occur at full video frame rates, as will the updates of the spatial audio. This is possible because each "Image Sphere" contains all of the required information for both video and audio for any viewer orientation (azimuth and elevation).

Figure 9:
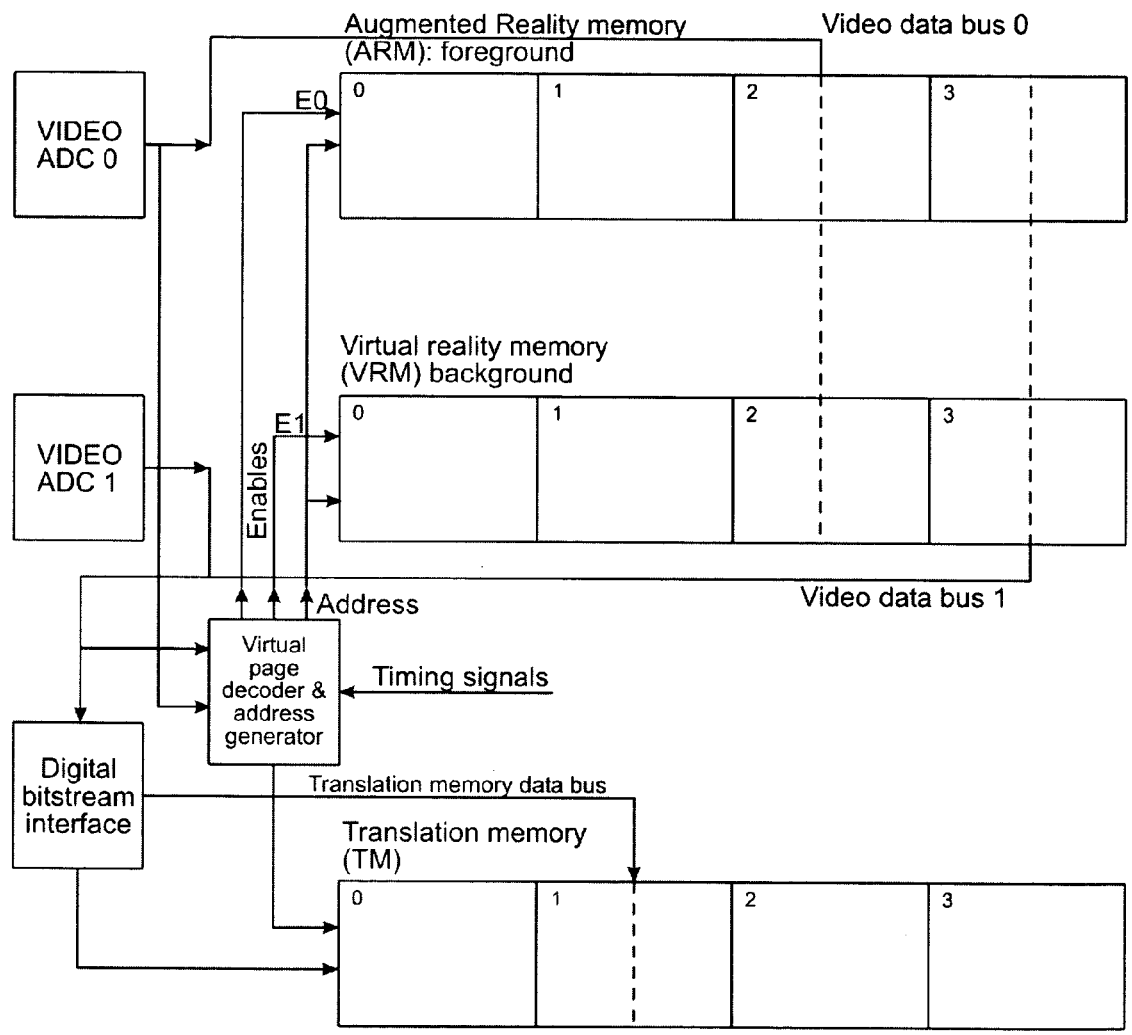
FIG. 9 is a VTV graphics engine diagram showing the data write side of the VTV processor.

As can be seen in FIG. 9. The memory write side of the VTV processor shows two separate video input stages (ADC's). It should be noted that although ADC-0 would generally be used for live panoramic video feeds and ADC-2 would generally be used for virtual reality video feeds from pre-rendered video material, both video input stages have full access to both augmented reality and virtual reality memory (i.e. they use a memory pool). This hardware configuration allows for more versatility in the design and allows several unusual display modes (which will be covered in more detail in later sections). Similarly, the video output stages (DAC-0 and DAC-1) have total access to both virtual and augmented reality memory.

Although having two input and two output stages improves the versatility of the design, the memory pool style of design means that the system can function with either one or two input and/or output stages (although with reduced capabilities) and as such the presence of either one or two input or output stages in a particular implementation should not limit the generality of the specification.

For ease of design, high-speed static RAM was utilized as the video memory in the prototype device. However, other memory technologies may be utilized without limiting the generality of the design specification.

In the preferred embodiment, the digital processing hardware would take the form of one or more field programmable logic arrays or custom ASIC. The advantage of using field programmable logic arrays is that the hardware can be updated at anytime. The main disadvantage of this technology is that it is not quite as fast as an ASIC. Alternatively, high-speed conventional digital processors may also be utilized to perform this image analysis and/or graphics generation task.

As previously described, certain sections of this hardware may be incorporated in the HMD, possibly even to the point at which the entire VTV hardware exists within the portable HMD device. In such a case the VTV base station hardware would act only as a link between the HMD and the Internet or other network with all graphics image generation, image analysis and spatial object recognition occurring within the HMD itself.

Figure 10:
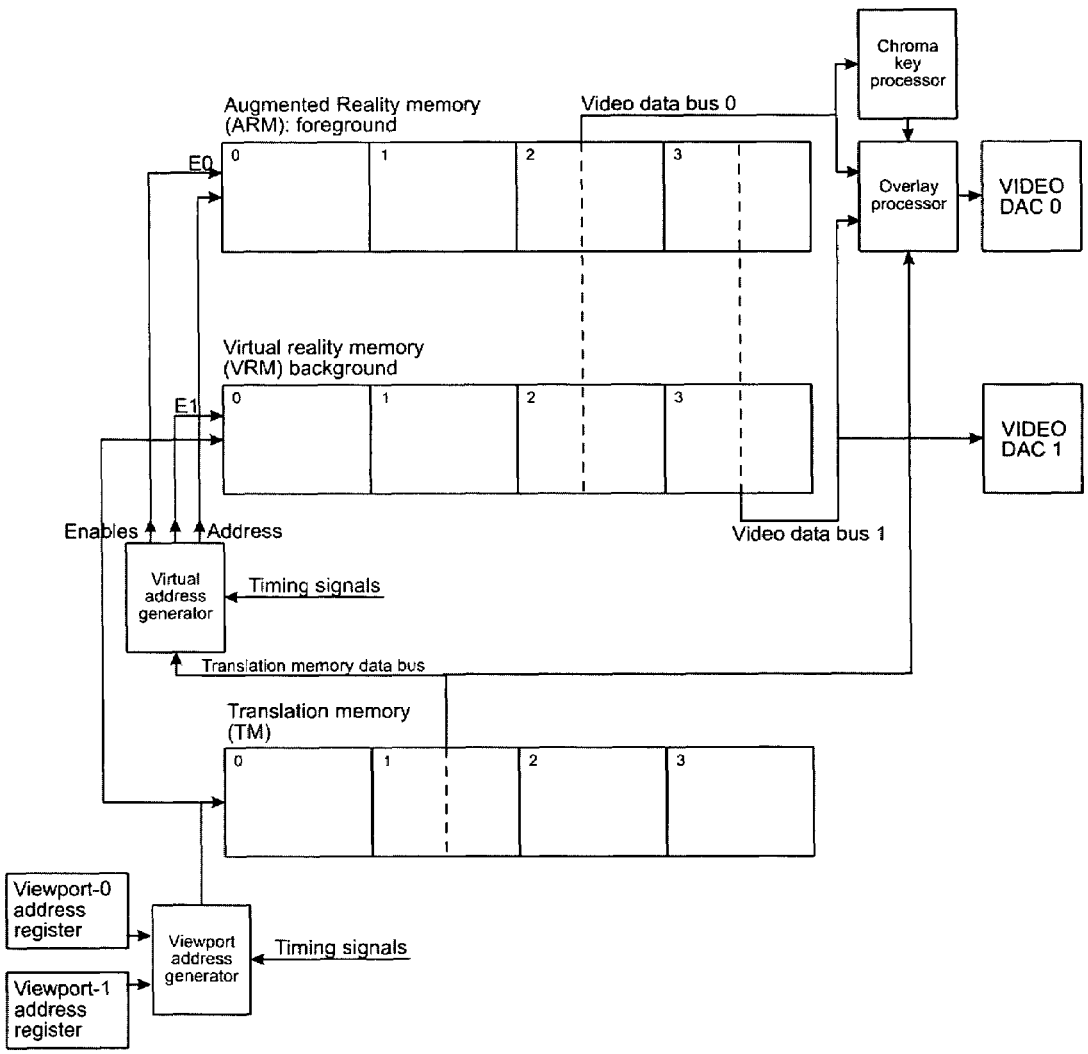
FIG. 10 is a VTV graphics engine diagram showing the data read side of the VTV processor.

Note: The low order bits of the viewport address generator are run through a look up table address translator for the X and Y image axes which impose barrel distortion on the generated images. This provides the correct image distortion for the current field of view for the viewport. This hardware is not shown explicitly in FIG. 10 because it will probably be implemented within an FPGA or ASIC logic and thus comprises a part of the viewport address generator functional block. Likewise roll of the final image will likely be implemented in a similar fashion.

It should be noted that only viewport-0 is affected by the translation engine (Warp Engine), Viewport-1 is read out undistorted. This is necessary when using the superimpose and overlay augmented reality modes because VR-video material being played from storage has already been "flattened" (i.e. pincushion distorted) prior to being stored whereas the live video from the panoramic cameras on the HMD require distortion correction prior to being displayed by the system in Augmented Reality mode. After this preliminary distortion, images recorded by the panoramic cameras in the HMD should be geometrically accurate and suitable for storage as new VR material in their own right (i.e. they can become VR material). One of the primary roles of the Warp Engine is then to provide geometry correction and trimming of the panoramic camera's on the HMD. This includes the complex task of providing a seamless transition between camera views.

Figure 8:
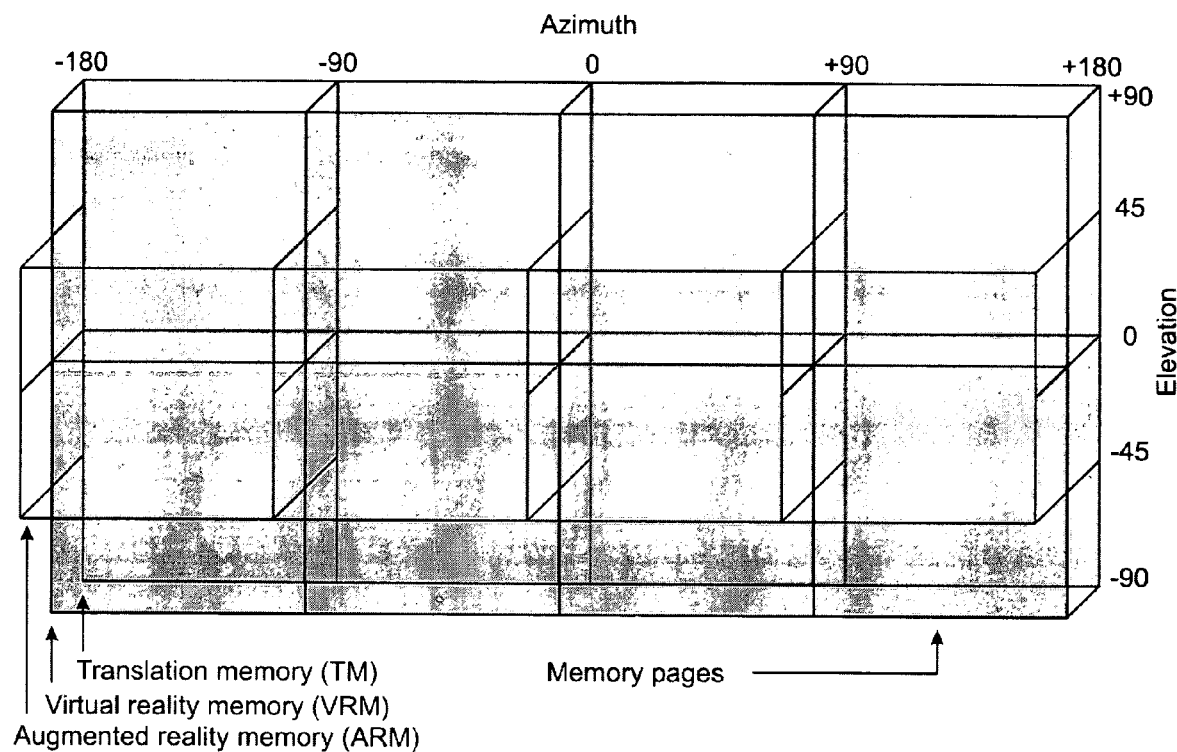
FIG. 8 is a depiction of a VTV memory map for a system utilizing both augmented reality memory and virtual reality memory.

Exception Processing:

As can be seen in FIGS. 4,5 a VTV image frame consists of either a cylinder or a truncated sphere. This space subtends only a finite vertical angle to the viewer (+/−45 degrees in the prototype). This is an intentional limitation designed to make the most of the available data bandwidth of the video storage and transmission media and thus maintain compatibility with existing video systems. However, as a result of this compromise, there can exist a situation in which the view port exceeds the scope of the image data. There are several different ways in which this exception can be handled. Firstly, the simplest way to handle this exception is to simply make out of bounds video data black. This will give the appearance of being in a room with a black ceiling and floor. However, an alternative and preferable configuration is to use a secondary video memory store to store a full 360 degree*180 degree background image map at reduced resolution. This memory area is known as Virtual reality memory (VRM). The basic memory map for the system utilizing both augmented reality memory and virtual reality memory (in addition to translation memory) is shown in FIG. 8. As can be seen in this illustration. The translation memory area must have sufficient range to cover a full 360 degree*180 degrees and ideally have the same angular resolution as that of the augmented reality memory bank (which covers 360 degree*90 degree). With such a configuration, it is possible to provide both floor and ceiling exception handling and variable transparency imagery such as looking through windows in the foreground and showing the background behind them. The backgrounds can be either static or dynamic and can be updated in basically the same way as foreground (augmented reality memory) by utilizing a Paged format.

Modes of Operation:

The VTV system has two basic modes of operation. Within these two modes there also exist several sub modes. The two basic modes are as follows:

a) Augmented reality mode b) Virtual reality mode

Augmented Reality Mode 1:

In augmented reality mode 1, selective components of "real world imagery" are overlaid upon a virtual reality background. In general, this process involves first removing all of the background components from the "real world" imagery. This can be easily done by using differential imaging techniques. I.e. by comparing current "real world" imagery against a stored copy taken previously and detecting differences between the two. After the two images have been correctly aligned, the regions that differ are new or foreground objects and those that remain the same are static background objects. This is the simplest of the augmented reality modes and is generally not sufficiently interesting as most of the background will be removed in the process. It should be noted that, when operated in mobile Pan-Cam (telepresense) or augmented reality mode the augmented reality memory will generally be updated in sequential Page order (i.e. updated in whole system frames) rather than random Page updates. This is because constant variations in the position and orientation of the panoramic camera system during filming will probably cause mis-matches in the image Pages if they are handled separately.

Augmented Reality Mode 2:

Augmented reality mode 2 differs from mode 1 in that, in addition to automatically extracting foreground and moving objects and placing these in an artificial background environment, the system also utilizes the Warp Engine to "push" additional "real world" objects into the background. In addition to simply adding these "real world" objects into the virtual environment the Warp Engine is also capable of scaling and translating these objects so that they match into the virtual environment more effectively. These objects can be handled as opaque overlays or transparencies.

Augmented Reality Mode 3:

Augmented reality mode 3 differs from the mode 2 in that, in this case, the Warp Engine is used to "pull" the background objects into the foreground to replace "real world" objects. As in mode 2, these objects can be translated and scaled and can be handled as either opaque overlays or transparencies. This gives the user to the ability to "match" the physical size and position of a "real world" object with a virtual object. By doing so, the user is able to interact and navigate within the augmented reality environment as they would in the "real world" environment. This mode is probably the most likely mode to be utilized for entertainment and gaming purposes as it would allow a Hollywood production to be brought into the users own living room.

Enhancements:

Clearly the key to making augmented reality modes 2 and 3 operate effectively is a fast and accurate optical tracking system. Theoretically, it is possible for the VTV processor to identify and track "real world" objects in real-time. However, this is a relatively complex task, particularly as object geometry changes greatly with changes in the viewer's physical position within the "real world" environment, and as such, simple auto correlation type tracking techniques will not work effectively. In such a situation, tracking accuracy can be greatly improved by placing several retroflective targets on key elements of the objects in question. Such retroflective targets can easily be identified by utilizing relatively simple differential imaging techniques.

Virtual Reality Mode:

Virtual reality mode is a functionally simpler mode than the previous augmented reality modes. In this mode "prefilmed" or computer-generated graphics are loaded into augmented reality memory on a random Page by Page basis. This is possible because the virtual camera planes of reference are fixed. As in the previous examples, virtual reality memory is loaded with a fixed or dynamic background at a lower resolution. The use of both foreground and background image planes makes possible more sophisticated graphics techniques such as motion parallax.

Enhancements:

The versatility of virtual reality memory (background memory) can be improved by utilizing an enhanced form of "blue-screening". In such a system, a sample of the "chroma-key" color is provided at the beginning of each scan line in the background field (area outside of the active image area). This provides a versatile system in which any color is allowable in the image. Thus, by surrounding individual objects with the "transparent" chroma-key color, problems and inaccuracies associated with the "cutting and pasting" of this object by the Warp Engine are greatly reduced. Additionally, the use of "transparent" chroma-keyed regions within foreground virtual reality images allows easy generation of complex sharp edged and/or dynamic foreground regions with no additional information overhead.

The Camera System:

As can be seen in the definition of the graphic standard, additional Page placement and tracking information is required for the correct placement and subsequent display of the imagery captured by mobile Pan-Cam or HMD based video systems. Additionally, if Spatial audio is to be recorded in real-time then this information must also be encoded as part of the video stream. In the case of computer-generated imagery this additional video information can easily be inserted at render-stage. However, in the case of live video capture, this additional tracking and audio information must be inserted into the video stream prior to recording. This can effectively be achieved through a graphics processing module herein after referred to as the VTV encoder module.

Image Capture:

In the case of imagery collected by mobile panoramic camera systems, the images are first processed by a VTV encoder module. This device provides video distortion correction and also inserts video Page information, orientation tracking data and spatial audio into the video stream. This can be done without altering the video standard, thereby maintaining compatibility with existing recording and playback devices. Although this module could be incorporated within the VTV processor, having this module as a separate entity is advantageous for use in remote camera applications where the video information must ultimately be either stored or transmitted through some form of wireless network Tracking System:

For any mobile panoramic camera system such as a "Pan-Cam" or HMD based camera system, tracking information must comprise part of the resultant video stream in order that an "absolute" azimuth and elevation coordinate system be maintained. In the case of computer-generated imagery this data is not required as the camera orientation is a theoretical construct known to the computer system at render time.

The Basic System:

The basic tracking system of the VTV HMD utilizes on-board panoramic video cameras to capture the required 360 degree visual information of the surrounding real world environment. This information is then analyzed by the VTV processor (whether it exists within the HMD or as a base station unit) utilizing computationally intensive yet relatively algorithmically simple techniques such as auto correlation. Examples of a possible algorithm are shown in FIGS. 13-19.

The simple tracking system outlined in FIGS. 13-19 detects only changes in position and orientation. With the addition of several retroflective targets, which can be easily distinguished from the background images using differential imaging techniques, it is possible to gain absolute reference points. Such absolute reference points would probably be located at the extremities of the environmental region (i.e. confines of the user space) however they could be placed anywhere within the real environment, provided the VTV hardware is aware of the real world coordinates of these markers. The combination of these absolute reference points and differential movement (from the image analysis data) makes possible the generation of absolute real world coordinate information at full video frame rates. As an alternative to the placement of retroflective targets at known spatial coordinates, active optical beacons could be employed. These devices would operate in a similar fashion to the retroflective targets in that they would be configured to strobe light in synchronism with the video capture rate thus allowing differential video analysis to be performed on the resultant images. However, unlike passive retroflective targets, active optical beacons could, in addition to strobing in time with the video capture, transmit additional information describing their real world coordinates to the HMD. As a result, the system would not have to explicitly know the locations of these beacons as this data could be extracted "on the fly". Such a system is very versatile and somewhat more rugged than the simpler retroflective configuration.

Figure 20:
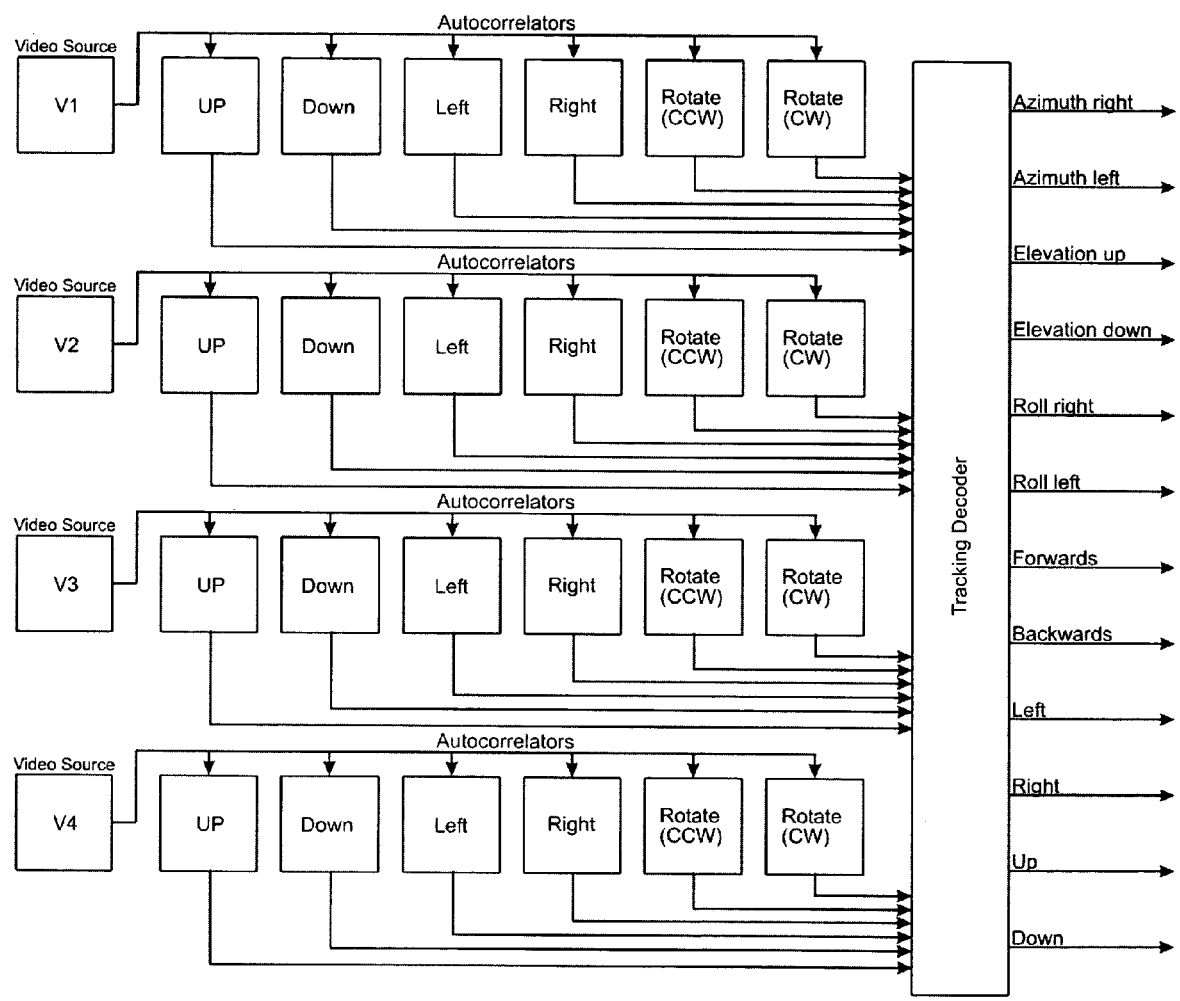
FIG. 20 is a block diagram of hardware for an optical tracking system according to a simplified version.

Note: FIG. 20 shows a simplistic representation of the tracking hardware in which the auto correlators simply detect the presence or absence of a particular movement. A practical system would probably incorporate a number of auto correlators for each class of movement (for example there may be 16 or more separate auto correlators to detect horizontal movement). Such as system would then be able to detect different levels or amounts of movement in all of the directions.

Alternate Configurations:

An alternative implementation of this tracking system is possible utilizing a similar image analysis technique to track a pattern on the ceiling to achieve spatial positioning information and simple "tilt sensors" to detect angular orientation of the HMD/Pan-Cam system. The advantage of this system is that it is considerably simpler and less expensive than the full six axis optical tracker previously described. The fact that the ceiling is at a constant distance and known orientation from the HMD greatly simplifies the optical system, the quality of the required imaging device and the complexity of the subsequent image analysis. As in the previous six-axis optical tracking system, this spatial positioning information is inherently in the form of relative movement only. However, the addition of "absolute reference points" allows such a system to re-calibrate its absolute references and thus achieve an overall absolute coordinate system. This absolute reference point calibration can be achieved relatively easily utilizing several different techniques. The first, and perhaps simplest technique is to use color sensitive retroflective spots as previously described. Alternately, active optical beacons (such as LED beacons) could also be utilized. A further alternative absolute reference calibration system which could be used is based on a bi-directional infrared beacon. Such as system would communicate a unique ID code between the HMD and the beacon, such that calibration would occur only once each time the HMD passed under any of these "known spatial reference points". This is required to avoid "dead tracking regions" within the vicinity of the calibration beacons due to multiple origin resets.

Simplifications:

The basic auto correlation technique used to locate movement within the image can be simplified into reasonably straightforward image processing steps. Firstly, rotation detection can be simplified into a group of lateral shifts (up, down, left, right) symmetrical around the center of the image (optical axis of the camera). Additionally, these "sample points" for lateral movement do not necessarily have to be very large. They do however have to contain unique picture information. For example a blank featureless wall will yield no useful tracking information However an image with high contrast regions such as edges of objects or bright highlight points is relatively easily tracked. Taking this thinking one step further, it is possible to first reduce the entire image into highlight points/edges. The image can then be processed as a series of horizontal and vertical strips such that auto correlation regions are bounded between highlight points/edges. Additionally, small highlight regions can very easily be tracked by comparing previous image frames against current images and determining "closest possible fit" between the images (i.e. minimum movement of highlight points). Such techniques are relatively easy and well within the capabilities of most moderate speed micro-processors, provided some of the image pre-processing overhead is handled by hardware.

I claim:

1. An interactive image capture and display system comprising:
   a) an image input means including an array of electronic image capture devices distributed in a horizontal plane such that their fields of view partially overlap and collectively cover a full 360 degrees; and
   b) an image storage and playback means compatible with existing television standards;
   c) a signal processing means including:
      1) a means of producing graphical imagery depicting a panoramic image such that said panoramic image is composed of a plurality of smaller image sections;
      2) a means for cropping, distorting and aligning individual images produced by the said image capture devices to produce an overall 360 degree panoramic image with negligible distortion and overlap between the individual image sections and wherein each pixel in the resulting 360 degree panoramic image has the same effective width, where each pixel subtends an equal horizontal angle to the center of said panoramic image;
      3) a means for generating an image representing a subset of the said 360 degree panoramic image, whereby the azimuth and elevation of the center of said subset is adjustable by user control;
      4) a means for selectively combining and geometrically altering real time imagery from said capture devices and prerecorded imagery to create a composite augmented reality experience;
      5) a means for determining the correct location of said image sections within said 360 degree panoramic image utilizing additional information present in the source media;
      6) a means for inserting tracking information to describe at least the current orientation of said array of electronic image capture devices into an outgoing video stream;
      7) a means for encoding multi-track audio such that it maintains compatibility with standard video storage, playback and transmission systems; and
      8) a means for producing orientation-sensitive audio in real-time, utilizing multi-track audio information and controlled by coordinates of a viewport within said panoramic image;
   d) an image output means capable of outputting an image in a format compatible with existing television standards;
   e) an audio output means capable of outputting at least 2 channels of audio;
   f) a display means including at least one display device;
   g) a user control means including an input device allowing the user to control said signal processing means; and
   h) A tracking means capable of measuring at least azimuth and elevation of said array of electronic image capture devices.

2. The system according to claim 1 further comprising signal processing means for applying distortion correction to the images, wherein each pixel in the resulting 360 degree panoramic image has the same effective height, where each pixel subtends an equal vertical angle to the center of said panoramic image.

3. A system according to claim 1 in which said display means is a conventional television type display device and the user input means is an infrared or radio based manually operated remote control device.

4. A system according to claim 1 in which said display means is a helmet mounted display device and the user input means is an automatic tracking device that calculates at least azimuth and elevation of the user's head.

5. A system according to claim 1 which utilizes a modified television protocol comprising a plurality of video fields or frames such that each field or frame includes at least one of graphical data, sound data, and control information, wherein the signal from said image playback means is compatible with at least one widely accepted television standard.

6. A system according to claim 5 wherein said modified television protocol further comprises, within one or more scan lines of a standard video image, additional coded data defining control parameters and image manipulation data for a signal processing means.

7. A system according to claim 5 wherein said graphical data comprises sections of said 360 degree panoramic image.

8. A system according to claim 5 further comprising, within one or more scan lines of a standard video image, additional coded data providing information defining the placement position of image sections within said 360 degree panoramic image.

9. A system according to claim 5 further comprising within one or more scan lines of a standard video image, additional coded data providing information for the generation of four or more real-time audio tracks.

10. A system according to 5 further comprising, within one or more scan lines of a standard video image, additional coded data providing
   a) audio information for generation of four or more real-time audio tracks; and
   b) data descriptive of a number of employed audio tracks, an employed audio data format, an employed audio sampling rate, and track synchronization, whereby said signal processing means can decode the audio information into position and orientation sensitive sound.

11. A system according to claim 5 further comprising, within one or more scan lines of a standard video image, additional coded data which provides information as to absolute orientation and X-Y-Z position of said capture device array.

12. A system according to claim 1 further comprising
   a) means for mathematically combining information about azimuth and elevation of a viewer; and
   b) means for encoding multi-track audio for use with standard video storage and transmission systems such that the combined information can be subsequently decoded by specific hardware to produce a left and right audio channel with spatially correct three-dimensional audio for the left and right ears of a viewer.

13. A system according to claim 1 further comprising means for varying angular field of view of said viewport within said panoramic image responsive to runtime user control.

14. A system according to claim 1 further comprising means for varying the position of a viewpoint within a three-dimensional virtual space responsive to runtime user control.

15. A system according to claim 1 further comprising:
   a) a tracking device for continuously calculating a viewer's physical position; and
   b) means for varying the position of a viewpoint within a three-dimensional virtual space responsive to said position.

16. A system according to claim 1 further comprising means for providing orientation-sensitive audio in real-time, controlled by the direction of the viewer's head.

17. A system according to claim 1 further comprising means for providing orientation-sensitive audio in real-time, controlled by coordinates of a viewport within said panoramic image.

18. A system according to claim 1 further comprising means for providing position-sensitive audio in real-time, controlled by the virtual position of a viewpoint within a three-dimensional virtual space.

19. A system according to claim 1 wherein said signal processing means comprises
   a) one or more video digitizing modules;
   b) one or more memory areas selected from the group consisting of ARM, VRM, and TM;
   c) digital processing means for
      1) altering address mapping of data held in at least one of ARM and VRM so as to effectively move graphical information from one location to another therein; and
      2) mathematically combining and altering data from both a source location and a destination location, thereby achieving the functions of compositing and transformation; and
   d) one or more video generation modules.

20. A system according to claim 19 wherein said ARM is mapped to occupy a smaller vertical field of view than said VRM and said TM, thereby reducing the amount of data required for the generation of a high-quality image.

21. A system according to claim 19 further comprising means for mapping ARM, VRM, and TM at different resolutions, whereby pixels in each memory region can represent different degrees of angular deviation.

22. A system according to claim 1 further comprising
   a) means for displaying imagery;
   b) means for placing said real-time video imagery into ARM and source information from said video playback means into VRM; and
   c) means for combining imagery from ARM and VRM according to a pattern of data held in TM into a composite image before display.

23. A system according to claim 1 further comprising:
   a) means for displaying imagery;
   b) means for placing source information from said video playback means into ARM and VRM; and
   c) means for combining imagery from ARM and VRM according to a translation map included in the source media.

24. The system according to claim 1 further comprising
   a) means for displaying imagery;
   b) means for placing source information from said video playback means into ARM and VRM; and
   c) means for combining imagery from ARM and VRM in accordance with a geometric interpretation of said real-time video imagery.

25. A system according to claim 1 further comprising signal processing means for inserting identification information to describe the location of individual image sections that comprise said 360 degree panoramic image into said outgoing video stream.

26. A system according to claim 1 wherein said tracking information also describes the current spatial position of said array of electronic image capture devices into said outgoing video stream.

27. A system according to claim 1 whereby said signal processing means utilizes data received from said away of electronic image capture devices and, by performing a series of image analysis processes, calculates changes in the orientation of said array of electronic image capture devices.

28. A system according to claim 1 whereby said signal processing means utilizes data received from said away of electronic image capture devices and, by performing a series of image analysis processes, calculates changes in the position of said away of electronic image capture devices.

29. A system according to claim 1 wherein said tracking means comprises a) a plurality of reflective targets placed at predetermined coordinates;
b) a plurality of on-axis light sources strobed in synchronization with the capture rate of said array of electronic image capture devices; and
c) means for computing absolute angular and spatial data based on said predetermined coordinates and relative angular and spatial data determined by said array of electronic image capture devices.

30. A system according to claim 29 further comprising a plurality of color filters positioned over said reflective targets, whereby the ability of said system to correctly identify and maintain tracking of said reflective targets is improved.

31. A system according to claim 29 wherein said light sources are color-controllable, whereby the ability of the system to correctly identify and maintain tracking of said reflective targets is improved.

32. A system according to claim 1 wherein said tracking means incorporates active beacons which utilize at least one of pulse timing and color of light to transmit spatial coordinates of each beacon to said array of electronic image capture devices, whereby relative angular and spatial data can be determined by said array of electronic image capture devices and converted into absolute angular and spatial data.

* * * * *